(12) United States Patent
Park et al.

(10) Patent No.: US 8,722,250 B2
(45) Date of Patent: May 13, 2014

(54) CATHODE ACTIVE MATERIAL, CATHODE INCLUDING THE CATHODE ACTIVE MATERIAL, LITHIUM BATTERY EMPLOYING THE CATHODE, AND METHOD OF PREPARING THE SAME

(75) Inventors: Min-sik Park, Suwon-si (KR); Won-chang Choi, Yongin-si (KR); Dong-min Im, Seoul (KR)

(73) Assignee: Samsung SDI Co., Ltd., Yongin-Si (KR)

(*) Notice: Subject to any disclaimer, the term of this patent is extended or adjusted under 35 U.S.C. 154(b) by 627 days.

(21) Appl. No.: 12/838,747

(22) Filed: Jul. 19, 2010

(65) Prior Publication Data

US 2011/0042609 A1    Feb. 24, 2011

(30) Foreign Application Priority Data

Aug. 20, 2009 (KR) .................. 10-2009-0077163

(51) Int. Cl.
*H01M 4/131* (2010.01)
(52) U.S. Cl.
USPC .............. 429/231.1; 424/231.3; 424/231.5; 424/231.6; 424/231.95; 252/519.1; 252/519.12
(58) Field of Classification Search
USPC ............... 252/519.1, 519.12; 429/231.1, 220, 429/231.3, 231.5, 231.6, 231.95
See application file for complete search history.

(56) References Cited

U.S. PATENT DOCUMENTS

| | | | |
|---|---|---|---|
| 6,680,143 B2 | 1/2004 | Thackeray et al. | |
| 2003/0129495 A1* | 7/2003 | Yamato et al. | 429/231.1 |
| 2007/0218359 A1* | 9/2007 | Shimizu et al. | 429/223 |
| 2008/0131778 A1 | 6/2008 | Watanabe et al. | |
| 2009/0220859 A1* | 9/2009 | Yoon et al. | 429/220 |

FOREIGN PATENT DOCUMENTS

| | | |
|---|---|---|
| JP | 2005-310744 | 11/2005 |
| JP | 2008-041570 | 2/2008 |
| JP | 2008-103204 | 5/2008 |
| KR | 1020090093165 A | 9/2009 |

OTHER PUBLICATIONS

High capacity double-layer surface modified cathode with improved rate capacity, Wang et al., Journal of Materials Chemistry, 2009, 19, 4965-4972.*
High capacity, surface-modified layered cathodes with low irrsversible capacity loss, Wu et al., Electrochemical and Solid-State Letters, 2006, 9 (5) A221-A224.*
Armstrong, A.R., et al., Demonstrating Oxygen Loss and Associated Structural Reorganization in the Lithium Battery Cathode Li[$Ni_{0.2}Li_{0.2}Mn_{0.6}$]$O_2$, JACS Articles, 2006, vol. 128, pp. 8694-8698.
Myung, S., et al., Role of Alumina Coating on Li—Ni—Co—Mn—O Particles as Positive Electrode Material for Lithium-Ion Batteries, American Chemical Society, Chem. Mater. 2005, vol. 17, pp. 3695-3704.M
Wu, Y. et al., Effect of Surface Modifications on the Layered Solid Solution Cathodes (1-z) Li[$Li_{1/3}Mn_{frax;2;3]O2}$]-(z) Li[$Mn_{0.5-y}Ni_{0.5-y}Co_{2y}$])$O_2$, Solide State Ionics, vol. 180, (2009) pp. 50-56, journal homepage: www.elsevier.com/locate/ssi.
Wu, Y., et al., Surface Modification of High Capacity Layered Li?[?$Li_{0.2}Mn_{0.54}Ni_{0.13}Co_{0.13}$?]?$O_2$ Cathodes by $AlPO_4$, Journal of the Electrochemical Society, 2008, vol. 155, Issue 9, pp. A635-A641.

* cited by examiner

*Primary Examiner* — Mark Kopec
*Assistant Examiner* — Haidung Nguyen
(74) *Attorney, Agent, or Firm* — Christie, Parker & Hale LLP

(57) ABSTRACT

A cathode active material including: a lithium metal oxide core represented by Formula 1 below; and an oxide coating layer formed on the lithium metal oxide core:

$Li[Li_xMe_yM_z]O_{2+d}$.    <Formula 1>

In Formula 1: $x+y+z=1$ ($0<x<0.33$ and $0<z<0.1$); $0\leq d\leq 0.1$; Me includes at least one metal selected from the group consisting of Ti, V, Cr, Mn, Fe, Co, Ni, Cu, Al, Mg, Zr, and B; and M includes at least one metal selected from the group consisting of Mo, W, Ir, Ni, and Mg.

17 Claims, 1 Drawing Sheet

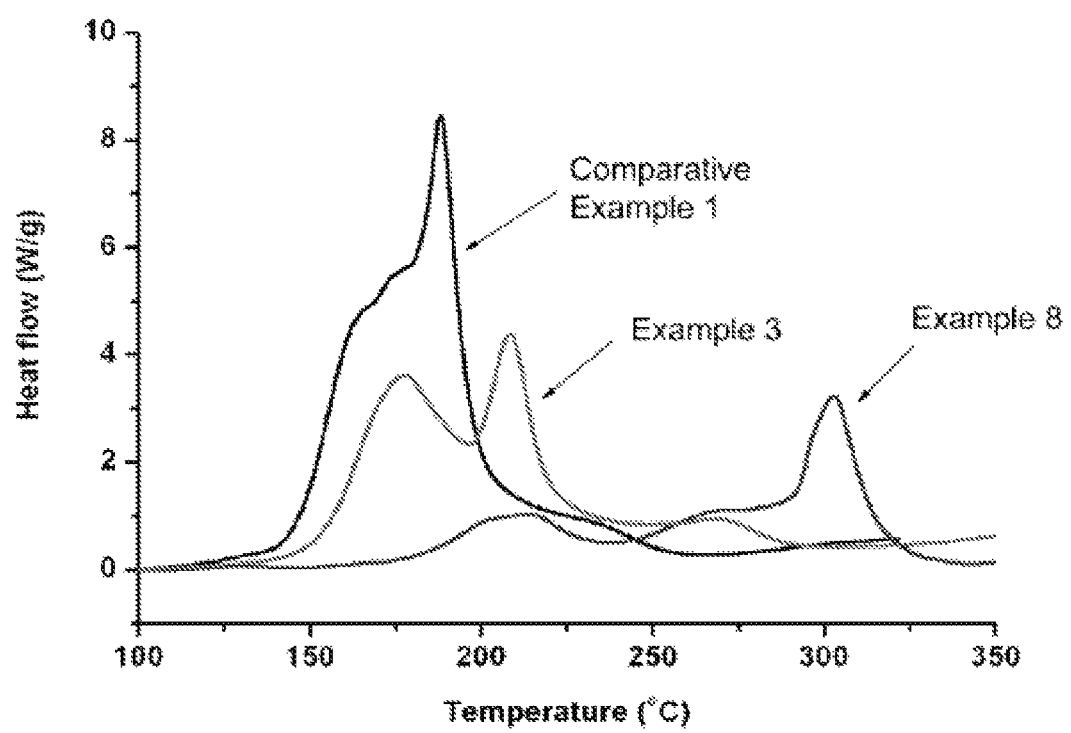

CATHODE ACTIVE MATERIAL, CATHODE INCLUDING THE CATHODE ACTIVE MATERIAL, LITHIUM BATTERY EMPLOYING THE CATHODE, AND METHOD OF PREPARING THE SAME

CROSS-REFERENCE TO RELATED APPLICATION

This application claims the benefit of Korean Patent Application No. 10-2009-0077163, filed Aug. 20, 2009, in the Korean Intellectual Property Office, the disclosure of which is incorporated herein, by reference.

BACKGROUND

1. Field

The present disclosure relates to a cathode active material, a cathode including the cathode active material, a lithium battery employing the cathode, and a method of preparing the cathode active material.

2. Description of the Related Art

In order to manufacture portable, high performance appliances, compact and light weight lithium batteries for the appliances are employed. Also, in order to be used in electric vehicles and the like, the stability, high-rate characteristics, and cycle-life characteristics of lithium batteries, at a high temperature and a high voltage, are important. To implement lithium batteries satisfying the uses, various cathode active materials have been suggested.

For example, $LiCoO_2$ is a commercialized cathode active material. $LiCoO_2$ is expensive, and has an actual electric capacity of about 140 to about 150 mAh/g, which is about 50% of its theoretical electric capacity.

A lithium metal oxide in the form of $Li[Li_xMe_{1-x}]O_2$ (x>0, Me is a plurality of transition metals), an over-lithiated transition metal oxide, provides an increased electric capacity of about 250 to about 280 mAh/g. The over-lithiated transition metal oxide has low electric conductivity and thus, has decreased high-rate characteristics and poor cycle-life characteristics.

Thus, a cathode active material that is stable at a high temperature and a high voltage, and has improved high-rate characteristics and cycle-life characteristics is needed.

SUMMARY

Provided are cathode active materials having a novel structure.

Provided are cathodes including the cathode active material.

Provided are lithium batteries employing the cathode.

Provided are methods of preparing the cathode active materials.

According to an aspect of the present invention, a cathode active material comprising: a lithium metal oxide core represented by Formula 1 below; and an oxide coating layer formed on the lithium metal oxide core:

$$Li[Li_xMe_yM_z]O_{2+d}.$$ <Formula 1>
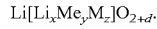

In Formula 1, x+y+z=1; 0<x<0.33, 0<z<0.1; 0≤d≤0.1; Me comprises at least one metal selected from the group consisting of Ti, V, Cr, Mn, Fe, Co, Ni, Cu, Al, Mg, Zr, and B; and M comprises at least one metal selected from the group consisting of Mo, W, Ir, Ni, and Mg.

According to an aspect of the present invention, a cathode comprising the above-described cathode active material is provided.

According to another aspect of the present invention, a lithium battery employing the above-described cathode is described.

According to another aspect of the present invention, a method of preparing a cathode active material is provided, the method comprising: preparing a mixture by mixing a lithium metal oxide of Formula 1 below, a precursor of an oxide for forming a coating layer, and a solvent; and drying and calcinating the mixture. The oxide precursor comprises a metal oxide precursor, a metal phosphorous oxide precursor, or a mixture thereof:

$$Li[Li_xMe_yM_z]O_{2+d}.$$ <Formula 1>

In Formula 1, x+y+z=1; 0<x<0.33, 0<z<0.1; 0≤d≤0.1, and Me comprises at least one metal selected from the group consisting of Ti, V, Cr, Mn, Fe, Co, Ni, Cu, Al, Mg, Zr, and B.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects of the present disclosure will become apparent and more readily appreciated from the following description of the exemplary embodiments, taken in conjunction with the accompanying drawings, of which:

FIG. 1 is a graph showing differential scanning calorimetry (DSC) curves for cathode active materials prepared in Comparative Example 1 and Examples 3 and 8.

DETAILED DESCRIPTION

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

Hereinafter, a cathode active material, a cathode including the cathode active material, a lithium battery employing the cathode, and a method of preparing the cathode active material, according to embodiments of the present invention will be described in detail.

According to an embodiment, a cathode active material includes a lithium metal oxide core represented by Formula 1 below; and an oxide coating layer formed on the lithium metal oxide core:

$$Li[Li_xMe_yM_z]O_{2+d}$$ <Formula 1>
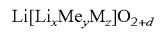

In Formula 1, x+y+z=1; 0<x<0.33, 0<z<0.1; 0≤d≤0.1; Me includes at least one metal selected from the group consisting of Ti, V, Cr, Mn, Fe, Co, Ni, Cu, Al, Mg, Zr, and B; and M includes at least one metal selected from the group consisting of Mo, W, Ir, Ni, and Mg. For example, z may be in a range of 0<z<0.05. The lithium metal oxide of Formula 1 may have a layered structure.

The oxide coating layer may be formed on a portion of, or on the whole surface of, the lithium metal oxide core. For example, the oxide coating layer may be in the form of islands on the surface of the lithium metal oxide core. Also, the lithium metal oxide core may be completely covered with the oxide coating layer. Due to the oxide coating layer, the lithium metal oxide core is electrically stabilized. When the oxide coating layer is integrated with the lithium metal oxide core, by being coated on the lithium metal oxide core, the thermal and electrical stabilities of the cathode active material are better than those of the uncoated lithium metal oxide core. For example, side reactions, such as elution of a transition metal at a high temperature, or gas generation at a high voltage, may be prevented. The oxide coating layer may be electrically conductive. The oxide coating layer may selectively form an alloy with lithium, and may be amorphous.

According to another embodiment, the oxide coating layer may include at least one selected from the group consisting of a metal oxide and a metal phosphorous oxide. The oxide coating layer may include a metal oxide represented by Formula 2 below.

$$M'O_p \qquad \text{<Formula 2>}$$

In Formula 2, $0<p<3$, and M' includes at least one metal selected from the group consisting of Al, Ba, Ca, Mg, Si, Ti, Zr, Zn, Sr, and Li. For example, the metal oxide may be $Al_2O_3$, CaO, or BaO.

Also, the oxide coating layer may include a metal phosphorous oxide represented by Formula 3 below:

$$M''(PO_4)_q \qquad \text{<Formula 3>}$$

In Formula 3, $0<q<2$, and M" includes at least one metal selected from the group consisting of Al, Fe, Ni, Mn, Co, and Li. For example, the metal phosphorous oxide may be $AlPO_4$.

According to an embodiment, the content of the oxide coating layer may be 10 wt % or less of the weight of the lithium metal oxide core. For example, the content of the oxide coating layer may be 0 through 10 wt %, or 0 through 5 wt %, based on the weight of the lithium metal oxide core. A lithium battery including the cathode active material including the oxide coating layer having the above content may have excellent cycle characteristics.

According to an embodiment, the lithium metal oxide may be represented by Formula 4 below:

$$Li[Li_xMe_yMo_z]O_{2+d} \qquad \text{<Formula 4>}$$

In Formula 4, $x+y+z=1$; $0<x<0.33$, $0<z<0.1$; $0\leq d\leq 0.1$, and Me may include at least one metal selected from the group consisting of Ti, V, Cr, Mn, Fe, Co, Ni, Cu, Al, Mg, Zr, and B. Z may be in a range of $0<z<0.05$.

According to an embodiment, the lithium metal oxide may be represented by Formula 5 below:

$$Li[Li_xNi_aCo_bMn_cM_z]O_{2+d} \qquad \text{<Formula 5>}$$

In Formula 5, $x+a+b+c+z=1$; $0<x<0.33$, $0<z<0.1$, $0<a\leq 0.2$, $0<b<0.2$, $0<c<0.6$; and $0\leq d\leq 0.1$, and M may include at least one metal selected from the group consisting of Mo, W, Ir, Ni, and Mg. The z may be in a range of $0<z<0.05$.

According to an embodiment, the lithium metal oxide may be represented by Formula 6 below:

$$Li[Li_xNi_aCo_bMn_cMo_z]O_{2+d} \qquad \text{<Formula 6>}$$

In Formula 6, $x+a+b+c+z=1$; $0<x<0.33$, $0<z<0.1$, $0<a\leq 0.2$, $0<b<0.2$, $0<c<0.6$; and $0\leq d\leq 0.1$. The z may be in a range of $0<z<0.05$.

For example, the lithium metal oxide may be $Li[Li_{0.2}Ni_{0.16}Co_{0.08}Mn_{0.54}Mo_{0.02}]O_2$, $Li[Li_{0.2}Ni_{0.16}Co_{0.08}Mn_{0.52}Mo_{0.04}]O_2$, $Li[Li_{0.2}Ni_{0.2}Co_{0.08}Mn_{0.48}Mo_{0.04}]O_2$, or $Li[Li_{0.167}Ni_{0.233}Co_{0.100}Mn_{0.467}Mo_{0.033}]O_2$.

One or more embodiments include a cathode including the cathode active material. For example, the cathode may be manufactured by molding a cathode active material composition, including the cathode active material, a binder, and the like, into a desired shape, or coating the cathode active material composition on a current collector, such as a copper foil, an aluminum foil, or the like.

In particular, a cathode active material composition is prepared by mixing a cathode active material, a conducting agent, a binder, and a solvent. The cathode active material composition may be directly coated on an aluminum foil current collector, to obtain a cathode plate. Alternatively, the cathode active material composition may be cast on a separate support, and then a cathode active material film separated from the support is laminated on an aluminum foil current collector, to obtain a cathode plate. The cathode is not limited to the examples described above, and may be one of a variety of types.

The conducting agent may include carbon black or graphite particulate. Examples of the binder include a vinylidene fluoride/hexafluoropropylene copolymer, polyvinylidene fluoride (PVDF), polyacrylonitrile, polymethylmethacrylate, polytetrafluoroethylene, mixtures of these materials, and a styrene butadiene rubber polymer. The solvent may include N-methyl-pyrrolidone, acetone, water, or the like. Here, the amounts of the cathode active material, the conducting agent, the binder, and the solvent used in the manufacture of the cathode are amounts generally used in the art.

According to another embodiment, a lithium battery employs a cathode including the cathode active material. The lithium battery may be manufactured as follows. First, a cathode is prepared according to the above-described method.

Next, an anode active material composition is prepared by mixing an anode active material, a conducting agent, a binder, and a solvent. An anode plate may be obtained by directly coating the anode active material composition on a copper current collector, or the anode active material composition may be cast on a separate support, and then an anode active material film separated from the support is laminated on a copper current collector to obtain an anode plate. The content of the anode active material, the conducting agent, the binder, and the solvent used in the manufacture of the lithium battery are amounts generally used in the art.

Examples of the anode active material include a lithium metal, a lithium alloy, carbonaceous materials, and graphite. For the anode active material composition, the same conducting agent, binder, and solvent as those for the cathode active material composition may be used. Alternatively, a plasticizer may be further added to the cathode active material composition and the anode active material composition, to form pores in an electrode plate.

The cathode and the anode may be separated from each other by a separator. The separator may be any separator that is commonly used for lithium batteries. The separator may have a low resistance to the migration of ions in an electrolyte and an excellent electrolyte-retaining ability. Examples of the separator may include glass fiber, polyester, Teflon, polyethylene, polypropylene, polytetrafluoroethylene (PTFE), and combinations thereof. The separator may be a non-woven or woven fabric. In particular, a windable separator including polyethylene, polypropylene or the like may be used for a lithium ion battery. A separator that retains a large amount of an organic electrolytic solution may be used for a lithium-ion polymer battery. These separators may be manufactured using the following method.

In particular, a separator composition is prepared by mixing a polymer resin, a filler, and a solvent, and then the separator composition may be directly coated and dried on an electrode, to obtain a separator film. Alternatively, the separator composition may be cast and dried on a support, and then a separator film separated from the support is laminated on an electrode.

The polymer resin may be any polymer resin that is commonly used for binding electrode plates in lithium batteries. Examples of the polymer resin may include a vinylidenefluoride/hexafluoropropylene copolymer, polyvinylidene fluoride (PVDF), polyacrylonitrile, polymethylmethacrylate and any mixtures thereof.

An electrolytic solution used in the lithium battery is prepared by dissolving an electrolyte in a solvent. The solvent may be selected from the group consisting of propylene carbonate, ethylene carbonate, fluoroethylene carbonate, diethyl carbonate, methylethyl carbonate, methylpropyl carbonate, butylene carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, dimethyl carbonate, methylisopropyl carbonate, ethylpropyl carbonate, dipropyl carbonate, dibutyl carbonate, diethylene glycol, dimethyl ether, and any mixtures thereof. The electrolyte may be a lithium salt, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are each independently a natural number, LiCl, LiI, or any mixtures thereof.

The separator is interposed between the cathode plate and the anode plate to form a battery assembly. The battery assembly is wound or folded and then sealed in a cylindrical or rectangular battery case. Then, the electrolytic solution described above is injected into the battery case to complete the manufacture of the lithium battery. The battery assembly is stacked in a bi-cell structure and impregnated with the electrolytic solution. The resultant is put into a pouch and hermetically sealed, thereby completing the manufacture of the lithium battery.

One or more embodiments of the present invention include a method of preparing a composite cathode active material, the method including: preparing a mixture by mixing a lithium metal oxide of Formula 1 below, a precursor of an oxide for forming a coating layer, and a solvent; drying the mixture; and calcinating the dried product. The oxide precursor is a metal oxide precursor, a metal phosphorus oxide precursor, or a mixture thereof.

$$Li[Li_xMe_yM_z]O_{2+d} \qquad <\text{Formula 1}>$$

In Formula 1, x+y+z=1; 0<x<0.33, 0<z<0.1; 0≤d≤0.1; Me includes at least one metal selected from the group consisting of Ti, V, Cr, Mn, Fe, Co, Ni, Cu, Al, Mg, Zr, and B; and M includes at least one metal selected from the group consisting of Mo, W, Ir, Ni, and Mg.

The metal oxide precursor may include at least one compound selected from the group consisting of a metal nitride, a metal acetate, a metal alkoxide, a metal chloride, and a metal sulfide. For example, the metal oxide precursor may be a nitride including at least one metal selected from the group consisting of Al, Ba, Ca, Mg, Si, Ti, Zr, Zn, Sr, and Li, but is not limited thereto, and may be any precursor from which oxides including the metals may be obtained. The solvent may be any solvent generally used in the art. For example, the solvent may be water, ethanol, methanol, or the like.

The calcination (heat treatment) results in the formation of an oxide coating layer on a core. For example, a cathode active material complex having a core/coating layer structure may be obtained.

According to another embodiment, a method of preparing a cathode active material including a metal oxide coated with an oxide coating layer includes: mixing a lithium metal oxide represented by Formula 1, the metal oxide, and a solvent, to prepare a mixture slurry; and drying the mixture slurry at a temperature of 200° C. or less, for 0.1 through 10 hours, and heating the same in an air atmosphere at a temperature of 500° C. through 1000° C., for 1 through 10 hours. The conditions for the drying and calcinating are not limited thereto, and may be modified in various ways.

The metal phosphorous oxide precursor may also include a phosphorous compound and at least one compound selected from the group consisting of a metal nitride, metal acetate, a metal alkoxide, a metal chloride, and a metal sulfide. That is, the metal phosphorous oxide precursor may additionally include a phosphorous compound. The phosphorous compound is not limited, as long as it includes phosphorus (P), and may be any generally-used compound in the art. For example, the phosphorous compound may be mono-ammonium di-hydrogen phosphate.

According to another embodiment, a method of preparing a cathode active material including a coating layer including a metal phosphorous oxide includes: mixing a lithium metal oxide represented by Formula 1, the phosphorous compound, the metal nitride, and a solvent to prepare a mixture slurry; drying the mixture slurry at a temperature of 200° C. or less, for 0.1 through 10 hours, and calcinating the dried resultant at a temperature of 500° C. through 1000° C., for 1 through 10 hours. The conditions of the drying and calcinating operations are not limited thereto, and may be modified.

A method of preparing a lithium metal oxide used in the method of preparing the cathode active material may include, for example, preparing a sol by mixing a metal precursor, a dilute nitric acid, a citric acid solution, and ethylene glycol. Preparing a gel by heating the sol; thermally decomposing the gel; and heat-treating the thermally dissolved gel.

The metal precursor includes a lithium precursor and precursors of other metals constituting the lithium metal oxide. The form of the precursor is not limited and is generally in the form of a salt including a metal or a complex in which an organic ligand is coordinated on the metal.

The content of the metal precursor, according to the type of the metal of the metal precursor, may be selected in consideration of the composition of the desired lithium metal oxide. The metal precursor may include a first metal precursor including at least one metal selected from the group consisting of Ti, V, Cr, Mn, Fe, Co, Ni, Cu, Al, Mg, Zr, and B; and a second metal precursor including at least one metal selected from the group consisting of Mo, W, Ir, Ni, and Mg. For example, the first metal precursor may be nickel acetate, cobalt acetate, manganese acetate, or the like, the second metal precursor may be ammonium heptamolybdate, and the lithium precursor may be lithium carbonate.

The citric acid operates as a chelating agent. The ethylene glycol is gelated and operates as a matrix. The concentration of the dilute nitric acid may be in a range of about 0.01 wt % to about 10 wt %. The ratios of a mixture of the metal precursor, the citric acid, and the ethylene glycol may be within a range for obtaining enhanced cycle characteristics of a lithium battery.

The heating of the sol to form a gel and the thermally dissolving of the gel represent a change in phase of the sol, occurring while a reaction container containing the sol is continuously heated. That is, when the reaction container containing the sol is heated, the sol is changed to gel, and when water completely evaporates, a remaining product is thermally dissolved. In the thermally decomposing of the sol, the heating may be performed at a temperature of about 300° C. to about 500° C., for 1 through 5 hours, but is not limited thereto. The heat treatment of the thermally decomposed gel may be performed at a temperature of 850° C. through 1100° C., for 3 through 12 hours, but is not limited thereto. The thermally treated lithium metal oxide may be dried and cooled in a furnace.

A method of preparing the lithium metal oxide used in the preparing the cathode active material includes: preparing a first aqueous solution containing a first metal precursor; preparing a second aqueous solution including a lithium metal precursor and an acetic acid; preparing a third aqueous solution by adding a second metal precursor and a citric acid to the second aqueous solution; adding an oxalic acid aqueous solution to the mixture of the first and third aqueous solutions to obtain a precipitate; removing water from the precipitate and thermally decomposing the same; and heating the thermally decomposed precipitate.

The exemplary embodiments of the present disclosure will be described in detail, with reference to Examples and Comparative Examples below. However, these examples are for illustrative purposes only, and the embodiments of the present invention are not limited thereto.

Preparation of Cathode Active Material

Comparative Example 1

Preparation of
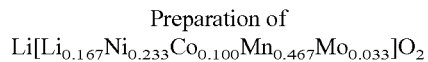

Lithium carbonate, nickel acetate, cobalt acetate, manganese acetate, and ammonium heptamolybdate were selected as starting materials. To prepare 0.04 mol of $Li[Li_{0.167}Ni_{0.233}Co_{0.100}Mn_{0.467}Mo_{0.033}]O_2$, mol ratios of Li, Ni, Co, Mn, and Mo were calculated, and corresponding starting materials were prepared according to the calculated mole ratios.

The starting materials were melted in 50 ml of a dilute nitric aqueous solution, in which 5 g of nitric acid (60 wt %) and 50 ml of distilled water were mixed. 50 ml of a citric acid aqueous solution (2M) and 30 ml of ethylene glycol were added to the above solution, to prepare a sol.

The sol was heated to evaporate water and thereby form a gel. The gel was continuously heated, until it was completely thermally decomposed. The thermally decomposed gel was put into a furnace and was heated at 950° C., for 5 hours, while refluxing dry air thereto, thereby preparing a cathode active material. The cathode active material was then cooled in the furnace.

Example 1

Preparation of Cathode Active Material Including $Al_2O_3$ Coating Layer

An input amount of aluminum nitrate nonahydrate was calculated, such that the content of $Al_2O_3$ (for forming a coating layer) would be 0.5 wt %, based on the 3 g of the cathode active material powder prepared in Comparative Example 1. The calculated aluminum nitrate nonahydrate was put into an agate mortar and mixed in 10 ml of ethanol, to prepare a solution. 3 g of the cathode active material prepared in Comparative Example 1 was mixed with the solution to prepare a mixture slurry. The mixture slurry was dried at 100° C., for 1 hour, and then thermally treated (fired) at 600° C., for 3 hours, in an air atmosphere, thereby preparing a cathode active material.

Example 2

Preparation of Cathode Active Material Including $Al_2O_3$ Coating Layer

A cathode active material was prepared in the same manner as Example 1, except that the input amount of aluminum nitrate nonahydrate was changed, such that the content of $Al_2O_3$ for forming a coating layer would be 1.0 wt %.

Example 3

Preparation of Cathode Active Material Including $Al_2O_3$ Coating Layer

A cathode active material was prepared in the same manner as Example 1, except that the input amount of aluminum nitrate nonahydrate was changed, such that the content of $Al_2O_3$ for forming a coating layer would be 2.0 wt %.

Example 4

Preparation of Cathode Active Material Including $Al_2O_3$ Coating Layer

A cathode active material was prepared in the same manner as Example 1, except that the input amount of aluminum nitrate nonahydrate was changed such that the content of $Al_2O_3$ for forming a coating layer would be 3.0 wt %.

Example 5

Preparation of Cathode Active Material Including $Al_2O_3$ Coating Layer

A cathode active material was prepared in the same manner as Example 1, except that the input amount of aluminum nitrate nonahydrate was changed such that the content of $Al_2O_3$ for forming a coating layer would be 5.0 wt %.

Example 6

Preparation of Cathode Active Material Including $AlPO_4$ Coating Layer

Input amounts of aluminum nitrate nonahydrate and monoammonium dihydrogen phosphate were respectively calculated such that the content of $AlPO_4$ for forming a coating layer would be 0.5 wt %, based on 3 g of powder of the cathode active material prepared in Comparative Example 1. The calculated aluminum nitride monohydrate and monoammonium dihydrogen phosphate were put into an agate mortar and mixed in 10 ml of ethanol, to prepare a solution. However, in this case, an excess of monoammonium dihydrogen phosphate was such that mol ratios of aluminum to phosphor (P) became Al:P=1:2. 3 g of the cathode active material prepared in Comparative Example 1 was added to the solution and mixed, to prepare a mixture slurry. The mixture slurry was dried at 100° C., for 1 hour, and then thermally treated (fired) at 600° C., for 3 hours, in an air atmosphere, thereby preparing another cathode active material.

Example 7

Preparation of Cathode Active Material Including AlPO$_4$ Coating Layer

A cathode active material was prepared in the same manner as Example 1, except that the input amounts of aluminum nitrate nonahydrate and monoammonium dihydrogen phosphate were changed, such that the content of AlPO$_4$ for forming a coating layer would be 1.0 wt %.

Example 8

Preparation of Cathode Active Material Including AlPO$_4$ Coating Layer

A cathode active material was prepared in the same manner as Example 1, except that the input amounts of aluminum nitrate nonahydrate and monoammonium dihydrogen phosphate were changed, such that the content of AlPO$_4$ for forming a coating layer would be 2.0 wt %.

Example 9

Preparation of Cathode Active Material Including AlPO$_4$ Coating Layer

A cathode active material was prepared in the same manner as Example 1, except that the input amounts of aluminum nitrate nonahydrate and monoammonium dihydrogen phosphate were changed, such that the content of AlPO$_4$ for forming a coating layer would be 3.0 wt %.

Example 10

Preparation of Cathode Active Material Including AlPO$_4$ Coating Layer

A cathode active material was prepared in the same manner as Example 1, except that the input amounts of aluminum nitrate nonahydrate and monoammonium dihydrogen phosphate were changed, such that the content of AlPO$_4$ for forming a coating layer would be 5.0 wt %.

Example 11

Preparation of Cathode Active Material Including BaO Coating Layer

An input amount of barium nitrate was calculated, such that a content of BaO for forming a coating layer would be 2.0 wt %, based on 3 g of powder of the cathode active material prepared in Comparative Example 1, and was put into an agate mortar and mixed in 10 ml of ethanol, to prepare a solution. 3 g of the cathode active material prepared in Comparative Example 1 was added to the solution and mixed, to prepare a mixture slurry. The mixture slurry was dried at 100° C., for 1 hour, and then thermally treated (fired) at 600° C., for 3 hours in an air atmosphere, thereby preparing another cathode active material.

Example 12

Preparation of Cathode Active Material Including CaO Coating Layer

An input amount of calcium nitrate was calculated, such that the content of CaO for forming a coating layer would be 2.0 wt %, based on 3 g of powder of the cathode active material prepared in Comparative Example 1, and was put into an agate mortar and mixed in 10 ml of ethanol, to prepare a solution. 3 g of the cathode active material prepared in Comparative Example 1 was added to the solution and mixed, to prepare a mixture slurry. The mixture slurry was dried at 100° C., for 1 hour, and then thermally treated (fired) at 600° C., for 3 hours in an air atmosphere, thereby preparing another cathode active material.

Manufacture of a Cathode and a Lithium Battery

Comparative Example 2

Powder of the cathode active material synthesized in Comparative Example 1 and a carbonaceous conducting agent (Ketjen Black; EC-600JD) were uniformly mixed, in a weight ratio of 93:3. A polyvinylidene fluoride (PVDF) binder solution was added thereto to prepare a slurry, wherein a weight ratio of the cathode active material to the carbonaceous conducting agent to the binder was 93:3:4.

The slurry of the cathode active material was coated on an aluminum foil having a thickness of 15 μm and then dried, to manufacture a cathode plate. The cathode plate was then vacuum-dried to manufacture a coil cell (CR2032 type) having a diameter of 12 mm.

In the manufacture of the coin cell, a lithium metal was used as a counter electrode, and as an electrolyte solution, a mixture solvent including ethylene carbonate (EC) and diethylcarbonate (DEC), in a volume ratio of 3:7, in which 1.3M LiPF$_6$ was dissolved, was used. A plurality of such coin cells were manufactured.

Examples 13 Through 24

A cathode and a lithium battery were manufactured in the same manner as in Comparative Example 2, except that the cathode active materials synthesized in Examples 1 through 12 were used. A plurality of lithium batteries were manufactured in each of Examples 13 through 24.

Comparative Example 2-1, and Examples 15-1, 20-1, 23-1, and 24-1

Lithium batteries were respectively manufactured in the same manner as in Comparative Example 2, Example 15, Example 20, Example 23, and Example 24, except that 18650 circular batteries were manufactured instead of the coil cells (CR2032 type).

Coin Cell Charging/Discharging Experiment

Evaluation Example 1

In a first cycle, the coil cells manufactured in Comparative Example 2 and Examples 13 through 24 were charged with a constant current of 12.5 mA/g, until a voltage of the coil cells reached 4.55 V (vs. Li). After reaching 4.55 V, the coil cells were charged with a constant voltage of 4.55 V, until the constant current was reduced by one tenth. After charging, the coil cells were discharged with a constant current of 12.5 mA/g, until the voltage of the coin cells reached 2V (vs. Li), to thereby measure the discharging capacity of the coin cells.

In a second cycle, the coil cells were charged with a constant current of 125 mA/g, until the voltage of the coil cells reached 4.55V (vs. Li). After reaching 4.55 V, the coil cells were charged with a constant voltage of 4.55 V, until the constant current was reduced by one tenth. After the charging, the coil cells were discharged with a constant current of 50 mA/g (0.2 C rate), until the voltage of the coil cells reached 2 V (vs. Li).

In a third cycle, the coil cells were charged with a constant current of 125 mA/g, until the voltage of the coil cells reached 4.55 V (vs. Li). After reaching 4.55 V, the coil cells were charged with a constant voltage of 4.55 V, until the constant current was reduced by one tenth. After the charging, the coil cells were discharged with a constant current of 25 mA/g (0.1 C rate), until the voltage of the coil cells reached 2 V (vs. Li).

In a fourth cycle, the coil cells were charged with a constant current of 125 mA/g, until the voltage of the coil cells reached 4.55 V (vs. Li). After reaching 4.55 V, the coil cells were charged with a constant voltage of 4.55 V, until the constant current was reduced by one tenth. After the charging, the coil cells were discharged with a constant current of 250 mA/g (1 C rate), until the voltage of the coil cells reached 2 V (vs. Li).

In fifth through fiftieth cycles, the coil cells were charged with a constant current of 125 mA/g, until the voltage of the coil cells reached 4.55 V (vs. Li). After the charging, the coil cells were discharged with a constant current of 125 mA/g (0.5 C rate), until the voltage of the coil cells reached 2 V (vs. Li).

The charging/discharging experiment was performed at a temperature of 25° C. Table 1 shows results of the experiment. An initial coulombic efficiency is represented by Equation 1 below. The high rate discharging capability is represented by a discharging capacity ratio (1 C/0.1 C) of Equation 2 below. The capacity retention ratio is represented by Equation 3 below.

Initial coulombic efficiency[%]=[discharging capacity at $1^{st}$ cycle/charging capacity at $1^{st}$ cycle]×100  <Equation 1>

Discharging capacity ratio[%]=[discharging capacity at 1 C rate($4^{th}$ cycle)/discharging capacity of 0.1 C rate($3^{rd}$ cycle)]×100  <Equation 2>

Capacity retention ratio[%]=[discharging capacity at $50^{th}$ cycle/discharging capacity at $5^{th}$ cycle]×100  <Equation 3>

TABLE 1

|  | Initial efficiency [%] | Discharging capacity ratio [%] | Capacity retention ratio [%] |
| --- | --- | --- | --- |
| Comparative Example 2 | 71.67 | 78.37 | 98.21 |
| Example 13 | 78.62 | 81.51 | 98.31 |
| Example 14 | 78.19 | 83.23 | 98.39 |
| Example 15 | 79.47 | 83.43 | 98.44 |
| Example 16 | 88.71 | 88.28 | 98.99 |
| Example 17 | 85.86 | 88.42 | 99.04 |
| Example 18 | 80.18 | 85.98 | 98.89 |
| Example 19 | 84.59 | 87.49 | 98.99 |
| Example 20 | 85.62 | 87.65 | 99.21 |
| Example 21 | 84.30 | 86.74 | 99.13 |
| Example 22 | 82.47 | 81.20 | 99.09 |
| Example 23 | 79.60 | 82.10 | 99.09 |
| Example 24 | 79.40 | 81.70 | 99.00 |

As shown in Table 1, the lithium batteries of Examples 13 through 24, which were manufactured using the cathode active material including a coating layer on a surface of the lithium metal oxide core, had better initial coulombic efficiencies, high rate capabilities (discharging capacity ratio), and cycle-life (capacity retention ratio) than the lithium battery manufactured in Comparative Example 2.

Thermal Stability Experiment of Cathode Active Material

Evaluation Example 2

In a first cycle, the coil cells manufactured in Comparative Example 2, and Examples 15 and 20 were charged with a constant current of 12.5 mA/g, until a voltage of the coil cells reached 4.55 V (vs. Li). After reaching 4.55 V, the coil cells were charged with a constant voltage of 4.55 V, until the constant current was reduced by one tenth. After charging, the coil cells were discharged with a constant current of 12.5 mA/g, until the voltage of the coin cells reached 2 V (vs. Li), to thereby measure the discharging capacity.

In a second cycle, the coil cells were charged with a constant current of 125 mA/g and a constant voltage of 4.55 V, until the voltage of the coil cells reached 4.55 V (vs. Li). After reaching 4.55 V, the coil cells were charged with a constant voltage of 4.55 V, until the constant current was reduced by one tenth. After the charging, the coil cells were discharged with a constant current of 50 mA/g (0.2 C rate), until the voltage of the coil cells reached 2 V (vs. Li).

Next, the coil cells were charged with a constant current of 125 mA/g, until the voltage of the coil cells reached 4.55 V (vs. Li). The charging/discharging experiment was performed at a temperature of 25° C.

The charged coil cells were disassembled to extract the cathode active materials, and the extracted cathode active materials were analyzed using differential scanning calorimetry (DSC). FIG. 1 is a graph showing results of the analysis. Referring to FIG. 1, the cathode active materials prepared in Examples 3 and 8 (used in the lithium batteries of Examples 15 and 20) had increased thermal stability, as compared to the cathode active material prepared in Comparative Example 1 (used in the lithium battery of Comparative Example 2).

Experiment for Testing Stability of the Cathode Active Material at High Temperature and High Voltage Evaluation Example 3

Measurement of Mo Elution Amount

Coil cells manufactured in Comparative Example 2 and Examples 15, 20, 23, and 24 were discharged with a constant current of 12.5 mA/g, until the voltage of the coil cells reached 4.55 V (vs. Li). After reaching 4.55 V, the coil cells were charged with a constant voltage of 4.55 V, until the constant current of the coin cells was reduced by one tenth. After the charging, the coil cells were discharged with a constant current of 12.5 mA/g, until the voltage of the coil cells reached 2 V (vs. Li), to measure the discharging capacity. The charging/discharging was performed at 60° C., three times.

Next, the coil cells were disassembled, and the amount of Mo reduced on the surfaces of the lithium metal constituting the counter electrodes was analyzed using inductively coupled plasma (ICP). The result of the analysis is shown in Table 2 below. An Mo elution ratio is calculated according to Equation 4 below.

Mo elution ratio[%]=[Mo content included in the cathode active material/Mo content reduced on the surface of the lithium metal]  <Equation 4>

TABLE 2

| | Mo elution ratio [%] |
|---|---|
| Comparative Example 2 | 25.98 |
| Example 15 | 0.47 |
| Example 20 | 4.82 |
| Example 23 | 0.80 |
| Example 24 | 0.28 |

As shown in Table 2, Examples 15, 20, 23, and 24 showed significantly reduced Mo elution ratios at a high temperature, as compared to Comparative Example 2.

Evaluation Example 4

Measurement of Amount of Generated Gas

The circular batteries manufactured in Comparative Example 2-1, and Examples 15-1, 20-1, 23-1, and 24-1 were charged with a constant current of 12.5 mA/g, until the voltage reached 4.55 V (vs. Li). After reaching 4.55 V, the circular batteries were charged with a constant current of 4.55 V, until the constant current was reduced by one tenth. After the charging, the coil cells were discharged with a constant current of 12.5 mA/g, until the voltage reached 2 V (vs. Li) to measure the discharging capacity. The charging/discharging was performed at a temperature of 25° C., three times.

During the three charging/discharging cycles, the amount of gas generated in the circular batteries was measured in real-time, using a sealed charge/discharge system including a gas pressure sensor. A result of the measurement is shown in Table 3.

TABLE 3

| | Amount of gas generated [bar] |
|---|---|
| Comparative Example 2-1 | 1.15 |
| Example 15-1 | 0.84 |
| Example 20-1 | 0.40 |
| Example 23-1 | Not measured |
| Example 24-1 | Not measured |

As shown in Table 3, the amount of gas generated in the lithium batteries of Examples 15-1, 20-1, 23-1, and 24-1 was significantly reduced at a high voltage, as compared to that of Comparative Example 2-1.

According to one or more embodiments of the present invention, by using the cathode active material having a novel structure, a lithium battery that is stable at a high voltage and a high temperature, and has improved high rate and cycle-life characteristics, may be provided.

Although a few exemplary embodiments of the present disclosure have been shown and described, it would be appreciated by those skilled in the art that changes may be made in these exemplary embodiments, without departing from the principles and spirit of the invention, the scope of which is defined in the claims and their equivalents.

What is claimed is:

1. A cathode active material comprising:
a lithium metal oxide core represented by Formula 1 below; and
an oxide coating layer formed on the lithium metal oxide core:

$$Li[Li_xNi_aMe_yM_z]O_{2+d},\qquad \text{<Formula 1>}$$

wherein,
$x+a+y+z=1$ ($0<x\leq 0.2$, $0\leq a\leq 0.2$, $y\geq 0$, and $0<z<0.1$),
$0\leq d\leq 0.1$,
Me comprises at least one metal selected from the group consisting of Ti, V, Cr, Mn, Fe, Co, Cu, Al, Mg, Zr, and B, and
M comprises at least one metal selected from the group consisting of Mo, W, Ir, and Mg.

2. The cathode active material of claim 1, wherein the oxide coating layer comprises at least one selected from the group consisting of a metal oxide and a metal phosphorous oxide.

3. The cathode active material of claim 1, wherein the oxide coating layer comprises a metal oxide represented by Formula 2 below, $$M'O_p,\qquad \text{<Formula 2>}$$

wherein,
$0<p<3$, and
M' comprises at least one metal selected from the group consisting of Al, Ba, Ca, Mg, Si, Ti, Zr, Zn, Sr, and Li.

4. The cathode active material of claim 3, wherein the metal oxide comprises $Al_2O_3$, CaO, or BaO.

5. The cathode active material of claim 1, wherein the oxide coating layer comprises a metal phosphorous oxide represented by Formula 3 below:

$$M''(PO_4)_q,\qquad \text{<Formula 3>}$$

wherein,
$0<q<2$, and
M" comprises at least one metal selected from the group consisting of Al, Fe, Ni, Mn, Co, and Li.

6. The cathode active material of claim 5, wherein the metal phosphorous oxide comprises $AlPO_4$.

7. The cathode active material of claim 1, wherein a content of the oxide coating layer is 10 wt % or less of the weight of the lithium metal oxide core.

8. The cathode active material of claim 1, wherein M of Formula 1 is Mo.

9. The cathode active material of claim 1, wherein the lithium metal oxide is represented by Formula 5 below:

$$Li[Li_xNi_aCo_bMn_cM_z]O_{2+d},\qquad \text{<Formula 5>}$$

wherein,
$x+a+b+c+z=1$ ($0<z<0.1$, $0<b<0.2$, and $0<c<0.6$),
$0\leq d\leq 0.1$, and
M comprises at least one metal selected from the group consisting of Mo, W, Ir, and Mg.

10. The cathode active material of claim 1, wherein the lithium metal oxide is represented by Formula 6 below:

$$Li[Li_xNi_aCo_bMn_cMo_z]O_{2+d},\qquad \text{<Formula 6>}$$

wherein,
$x+a+b+c+z=1$ ($0<z<0.1$, $0<b<0.2$, and $0<c<0.6$), and
$0\leq d\leq 0.1$.

11. The cathode active material of claim 10, wherein $0<z<0.05$.

12. A cathode comprising the cathode active material of claim 1.

13. A lithium battery employing the cathode of claim 12.

14. The cathode active material of claim 8, wherein,
$0.167\leq x\leq 0.2$ and $0<z<0.1$,
$0\leq d\leq 0.1$, and
Me comprises at least one metal selected from the group consisting of Ti, V, Cr, Mn, Fe, Co, Cu, Al, Mg, Zr, and B.

15. The cathode active material of claim 10, wherein,
x+a+b+c+z=1 ($0.167 \leq x \leq 0.2$, $0<z<0.1$, $0<a \leq 0.2$, $0<b<0.2$, and $0<c<0.6$), and
$0 \leq d \leq 0.1$.

16. The cathode active material of claim 15, wherein $0<z<0.05$.

17. A cathode active material comprising:
a lithium metal oxide core; and
an oxide coating layer formed on the lithium metal oxide core,
wherein the lithium metal oxide is
$Li[Li_{0.2}Ni_{0.16}Co_{0.08}Mn_{0.54}Mo_{0.02}]O_2$,
$Li[Li_{0.2}Ni_{0.16}Co_{0.08}Mn_{0.52}Mo_{0.04}]O_2$,
$Li[Li_{0.2}Ni_{0.2}Co_{0.08}Mn_{0.48}Mo_{0.04}]O_2$, or
$Li[Li_{0.167}Ni_{0.233}Co_{0.100}Mn_{0.467}Mo_{0.033}]O_2$.

* * * * *